United States Patent
Mallwitz

(10) Patent No.: US 8,259,468 B2
(45) Date of Patent: Sep. 4, 2012

(54) THREE-PHASE INVERTER FOR CONVERTING DC POWER FROM A GENERATOR INTO THREE-PHASE AC POWER

(75) Inventor: Regine Mallwitz, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 379 days.

(21) Appl. No.: 12/626,733

(22) Filed: Nov. 27, 2009

(65) Prior Publication Data

US 2010/0135051 A1    Jun. 3, 2010

(30) Foreign Application Priority Data

Nov. 28, 2008   (EP) .................................. 08 170 184

(51) Int. Cl.
*H02M 3/335*   (2006.01)
(52) U.S. Cl. .......................................... 363/17; 363/137
(58) Field of Classification Search .................... 363/16, 363/17, 132, 137
See application file for complete search history.

(56) References Cited

U.S. PATENT DOCUMENTS

| | | | |
|---|---|---|---|
| 3,278,825 A | 10/1966 | Haas, Jr. | |
| 4,445,049 A | 4/1984 | Steigerwald | |
| 4,750,102 A | 6/1988 | Yamano et al. | |
| 5,084,812 A | 1/1992 | Häusler et al. | |
| 6,266,260 B1 * | 7/2001 | Zahrte et al. | 363/132 |
| 7,440,300 B2 * | 10/2008 | Konishi et al. | 363/132 |
| 7,576,449 B2 | 8/2009 | Becker et al. | |
| 7,616,467 B2 | 11/2009 | Mallwitz | |
| 2007/0179720 A1 | 8/2007 | Becker et al. | |

FOREIGN PATENT DOCUMENTS

| | | |
|---|---|---|
| DE | 39 34 836 A1 | 4/1991 |
| DE | 199 37 410 A1 | 2/2001 |
| DE | 20 2006 001 063 U1 | 6/2006 |
| DE | 10 2006 003 904 A1 | 8/2007 |
| EP | 1 971 018 A1 | 9/2008 |
| WO | 2007/036374 A2 | 4/2007 |

OTHER PUBLICATIONS

European Search Report in co-pending related European Patent Application No. 09177391.1, mailed Apr. 8, 2010.

(Continued)

*Primary Examiner* — Shawn Riley
(74) *Attorney, Agent, or Firm* — Thomas, Kayden, Horstemeyer & Risley, LLP

(57) ABSTRACT

A three-phase inverter for converting DC power from a generator into three-phase AC power comprises a transformer for transforming two single phase alternating voltages with a fixed phase offset present at corresponding two primary windings into a three-phase alternating voltage present at secondary windings of the transformer. An inverter circuitry for receiving a direct voltage of the generator between two input lines and for supplying the two single phase alternating voltages to the two primary windings of the transformer is included in the three-phase inverter and comprises a split DC link having a center point connected to both input lines via corresponding capacitors and connected to a first terminal of each primary winding of the transformer, and two inverter half-bridges connected to both input lines, wherein a center point of each half bridge is connected to a second terminal of a corresponding one of the primary windings of the transformer.

13 Claims, 3 Drawing Sheets

OTHER PUBLICATIONS

Milanovic, et al., "DC to Three-Phase Inverter Based on Two-Phase to Three Phase Transformation", Industrial Electronics, 2002. ISIE 2002. Proceedings of the 2002 IEEE International Symposium on Jul. 8-11, Piscataway, NJ, USA, IEEE. vol. 3, 8, Jul. 2022, pp. 784-788.

"7.9 Scott—and Le Blanc—Connected Transformers", Heathcote, M. J. The J&P Transformer Book, Dec. 31, 1998, pp. 7329-735.

* cited by examiner

THREE-PHASE INVERTER FOR CONVERTING DC POWER FROM A GENERATOR INTO THREE-PHASE AC POWER

CROSS-REFERENCE TO RELATED APPLICATIONS

This application claims priority to co-pending European patent application No. EP 08 170 184.9 entitled "Dreiphasiger Wechselrichter für Photovoltaikanlagen", filed Nov. 28, 2008, which is incorporated herein by reference.

FIELD OF THE INVENTION

The present invention generally relates to three-phase inverters for converting DC power into AC power. More particular, the present invention relates to three-phase inverters for converting DC power provided by a photovoltaic power generator into three-phase AC power. Even more particular, the present invention relates to three-phase inverters having a transformer transforming two single-phase alternating voltages at a fixed phase offset into a three-phase alternating voltage, the two single-phase alternating voltages being provided by an inverter circuitry receiving a direct voltage.

BACKGROUND OF THE INVENTION

A lot of power plants such as photovoltaic power plants only feed electric power in a single-phase AC power grid or in one phase of a three-phase power grid. With increasing output power of photovoltaic power plants, however, it becomes more and more important to distribute the power fed in a three-phase AC power grid evenly over all three phases. This can be done by separate single-phase inverters feeding in different phases of a three-phased power grid. However, three-phase inverters directly providing three-phase output power to be fed in the three-phase power grid are preferred.

Published US patent application US 2007/0179720 A1 (corresponding to DE 10 2006 003 904 A1) discloses a method of converting direct voltage in three-phase alternating voltage by means of a plurality of single-phase inverters.

Published German patent application DE 199 37 410 A1 discloses a three-phase photovoltaic inverter which at first inverts the output voltage of photovoltaic modules in a first high frequency intermediate alternating voltage. A transformer is used to increase the voltage of the first high frequency intermediate voltage. The resulting second high frequency intermediate voltage is rectified to have an intermediate DC voltage. This intermediate DC voltage is then inverted in a three-phase output voltage.

German utility model DE 20 2006 001 063 U1 discloses a three-phase inverter for feeding electric power generated by a photovoltaic generator. The direct voltage received from the photovoltaic power generator is first converted by a DC/DC-converter, before it is inverted in a three-phase output voltage to execute a MPP (Maximum Power Point)-tracking, i.e. to vary the output voltage of the photovoltaic generator to maximize the electric energy supplied by the photovoltaic generator.

International patent application publication WO 2007/036374 A2 describes a single-phase inverter for two DC power generators and a method of operating this inverter. The two power generators are connected together so that one power generator has a positive and one has a negative potential with regard to a reference potential of the alternating voltage output by the inverter. The inverter itself is based on a combination of two buck converters.

U.S. Pat. No. 4,445,049 discloses a DC to AC inverter which delivers a sinusoidal (sine) wave form to a load. The input to the inverter is a DC source, and a gate controllable switch is connected in series with the DC source. At least two steering switches connect the controllable switch to opposite sides of the load. The two steering switches are alternately gated at the fundamental frequency of the desired sinusoidal wave form, alternately providing current in a first direction through said load and in a second direction opposite to the first direction. The gate controllable switch is pulse width modulated to achieve a sinusoidal output current wave form.

U.S. Pat. No. 3,278,825 discloses a static inverter utilizing a modified Scott-transformer. This static inverter comprises two identical inverter channels. The DC voltage which is to be changed into a three-phase AC voltage is furnished by a direct current source, which may be an array of solar cells. The output stage of each inverter channel is typically comprised of a pair of switch means which are connected to opposite terminals of the primary winding of a center-tapped transformer. The two switch means in the output stage are alternately closed thereby causing current to flow alternately in opposite direction through the transformer primary winding and back to the source. The closing of the switch means is controlled by an oscillator which supplies a sine wave at the desired frequency to a push-pull driver stage. The driver stage in turn generates square wave control pulses which are alternately applied to the switch means in the output stage. The current which flows in alternate directions in the primary winding of the transformer in the output stage generates a voltage which is approximate a square wave. This square wave will be coupled to the secondary winding of the transformer and then to a filter stage. The filter stage attenuates the higher harmonics of the square wave signal thus producing a sine wave output. The sine wave output of the filter is fed to a two-phase to three-phase conversion device such as a Scott transformer having two partial output transformers which are connected in T configuration. The voltages which are supplied to the primary windings of the two transformers which comprise the Scott-T are maintained 90° out of phase by a phase control unit.

Rhyne, Earl; Bratton, Dave: "Scott-T connected 3-phase inverters for telecommunication applications", PROCEEDINGS TELECOMMUNICATIONS ENERGY CONFERENCE, 19 Oct. 1986 (1986-10-19)-22 Oct. 1986 (1986-10-22), pp 461-468, XP 002521585, discuss the topology of a Scott-T connected inverter.

Badin, A. A. ET AL: "Three-phase series-buck rectifier with split DC-bus based on the Scott transformer", POWER ELECTRONIC SPECIALIST CONFERENCE 2008, PESC 2008, IEEE, IIEE, Piscataway, N.J., USA, 15 Jun. 2008 (2008-06-15) pp 516-522, XP 031300024 present a three-phase buck rectifier based on the Scott transformer.

German patent DE 39 34 836 discloses a railroad electric equipment in which two single-phase generators supply alternating voltages to the two primary windings of a Scott-transformer. The three-phase current output by the secondary windings of the Scott-transformer is first rectified and then inverted in a three-phase current of a desired grid frequency. This current is then fed in a three-phase power grid.

There still is a need for a three-phase inverter for converting DC power provided by a photovoltaic power generator in three-phase AC power having a small number of parts but nevertheless providing both for a galvanic separation of its output side from its input side and an AC output power of high grid conformity.

SUMMARY OF THE INVENTION

In an aspect of the invention, a three-phase inverter for converting DC power from a generator into three-phase AC power comprises a transformer for transforming two single phase alternating voltages with a fixed phase offset present at corresponding two primary windings of the transformer into a three-phase alternating voltage present at secondary windings of the transformer. An inverter circuitry for receiving a direct voltage of the generator between two input lines and for supplying the two single phase alternating voltages to the two primary windings of the transformer is included in the three-phase inverter and comprises a split DC link having a center point connected to both input lines via corresponding capacitors and connected to a first terminal of each primary winding of the transformer, and two inverter half-bridges connected to both input lines, wherein a center point of each half bridge is connected to a second terminal of a corresponding one of the primary windings of the transformer.

In a further aspect of the invention, a three-phase inverter for converting DC power from a generator into three-phase AC power comprises a Scott transformer with two primary windings and three secondary windings connected in T-configuration with three outer terminals, the Scott transformer being configured to transform two single phase alternating voltages at a fixed phase offset of approximately 90° which are applied to its two primary windings into a three-phase alternating voltage present at the three outer terminals. The three-phase inverter further includes an inverter circuitry for receiving a direct voltage of the generator between two input lines and for supplying the two single phase alternating voltages to the two primary windings of the Scott transformer, wherein the inverter circuitry comprises a split DC link having a center point connected to both input lines via corresponding capacitors and to a first terminal of each primary winding of the Scott transformer, and two inverter half-bridges, each comprising two semiconductor switches connected in series between the input lines, wherein a center point of each half-bridge is connected to a second terminal of a corresponding one of the primary windings of the Scott transformer, and wherein the two semiconductor are configured to be switched at a frequency substantially higher than a frequency of the two single phase alternating voltages to form a sine shape of the corresponding single phase alternating voltage. The inverter circuitry further comprises sine filters for smoothing the corresponding single phase alternating voltages.

In a further aspect of the invention, a three-phase inverter for converting DC power from a generator into three-phase AC power, the three-phase inverter comprises a transformer with two partial transformers each having one primary windings and two secondary windings, the four secondary windings of both partial transformers being connected in series via three connections, the transformer being configured to transform two single phase alternating voltages at a fixed phase offset of approximately 120° which are applied to its two primary windings into a three-phase alternating voltage present at the three connections. The three-phase inverter further comprises an inverter circuitry for receiving a direct voltage of the generator between two input lines and for supplying the two single phase alternating voltages to the two primary windings of the transformer, wherein the inverter circuitry includes a split DC link having a center point connected to both input lines via corresponding capacitors and connected to a first terminal of each primary winding of the transformer, and two inverter half-bridges, each comprising two semiconductor switches connected in series between the input lines, wherein a center point of each half-bridge is connected to a second terminal of a corresponding one of the primary windings of the transformer, and wherein the two semiconductor switches are configured to be switched at a frequency substantially higher than a frequency of the two single phase alternating voltages to form a sine shape of the corresponding single phase alternating voltage. The inverter circuitry further comprises sine filters for smoothing the corresponding single phase alternating voltages.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
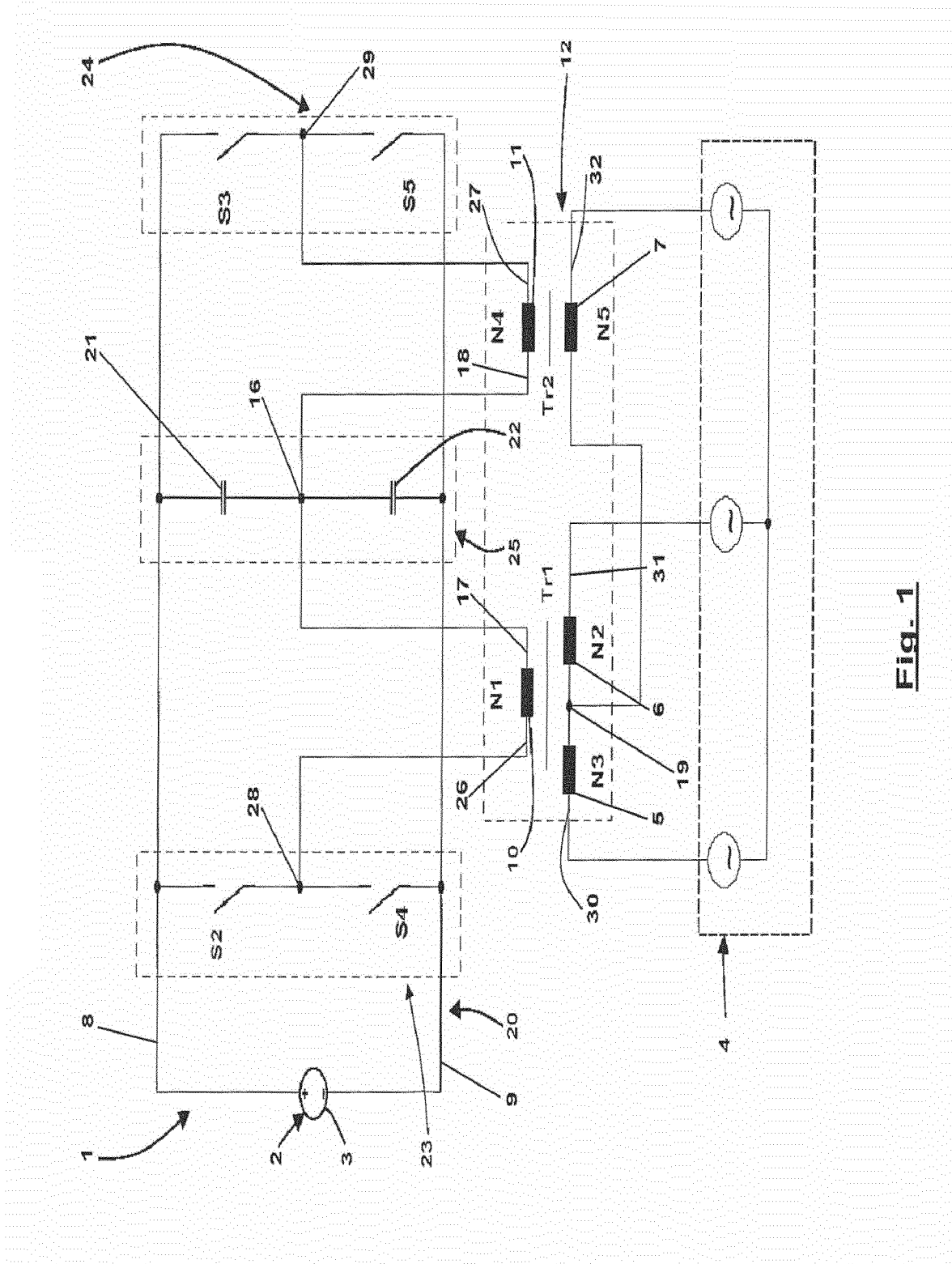
FIG. 1 is a circuit diagram of a first embodiment of the novel three-phase inverter comprising a Scott transformer.

A three-phase inverter for converting DC power from a generator into three-phase AC power comprises a transformer having two primary windings and at least three secondary windings, the transformer being configured for transforming two single phase alternating voltages at a fixed phase offset which are applied to its two primary windings into a three-phase alternating voltage present at its secondary windings; and an inverter circuitry for receiving a direct voltage of the generator and for providing the two single phase alternating voltages to the two primary windings of the transformer. The inverter circuitry comprises a divided intermediate direct current link or split DC link having a center point which is connected to both input lines via a capacitor and to a first terminal of each primary winding of the transformer, and two inverter half-bridges spanning between the input lines, each half-bridge having a bridge center point which is connected to a second terminal of one of the primary windings of the transformer.

Thus, the inverter circuitry providing the two single-phase alternating voltages to the two primary windings of the transformer comprises one DC link supplying two inverter half bridges with DC power. The half bridges alternately connect their center points each connected to one terminal of one of the primary windings of the transformer to the two electric potentials of the direct current link. The other terminals of both primary windings of the Scott transformer are connected to a center point of the DC link which, for this purpose, is divided in that one electric capacity is provided on both sides of the center point, both capacities together providing the overall capacity of the direct current link. The buffer capability of these two capacities may be kept quite low in the novel three-phase inverter as the loads to be buffered by them are reduced due to the offset of the two singe-phase alternating voltages formed by the two half bridges. In other words, the directions of the currents from the center point of the DC link towards the two half bridges are only identical for a limited part of the period of the alternating voltages. During the other part of the period, the directions of the currents from the two half bridges are opposite to each other so that they at least partially support each other directly. With regard to this at least partially support the capacity of the DC link is not necessarily loaded or unloaded and may thus be kept small.

Although providing a three-phase AC output power, the novel three-phase inverter may be operated with as few as four switches. Generally, the switches may be semiconductor switches, e.g. gate controlled switches. Preferably, the two switches of each half bridge are switched at a high frequency, e.g. at a frequency substantially higher than a frequency of the two single phase alternating voltages, to form a sine shaped alternating current through the primary windings of the transformer. The frequency of the two single phase alternating voltages and the equal frequency of the three phase alternating voltage output by the three-phase inverter are in a typical range of 50 to 400 Hz, whereas the high frequency may, for example, be in the kHz range from 1 kHz to 100 kHz. The formation of the sine shaped alternating currents may be done according to the known principle of pulse width modulation (PWM). The currents formed by PWM may be passed through a sine filter to smoothen their course. However, these sine filters may be kept quite simple as they have just to smoothen the high frequency switching effects of the switches which are additionally smoothened by the primary winding of the transformer. Each sine filter may comprise a capacitor connected in parallel to the respective primary winding of the transformer and an inductor connected in series to the respective primary winding of the transformer.

Providing the sine filters for the alternating single-phase voltages and the resulting alternating currents on the primary side of the transformer reduces the number of sine filters to two as compared to three sine filters which are necessary, if the currents through the secondary windings of the Scott-transformer are filtered to provide for a sine shaped output of the novel three-phase inverter.

The transformer transforming the two single-phase alternating voltages in the three-phase alternating voltage may be a so-called Scott transformer having three secondary windings connected in T configuration. One of the two primary windings and one of the three secondary windings are parts of one of two partial transformers of the Scott transformer, whereas the other primary winding and the other two secondary windings are parts of the other partial transformer. A Scott-transformer transforms two single-phase alternating voltages at an offset of 90° in the desired three-phase alternating voltage. Due to this offset the currents from the two primary windings to the center point of the split DC link have different directions for half of the period of the alternating voltages which all have the same frequency.

The transformer transforming the two single-phase alternating voltages in the three-phase alternating voltage may also comprise two partial transformers each comprising one primary winding and two secondary windings of opposite winding orientation, all four secondary windings of the transformer being connected in series and providing the three-phase alternating voltage at connection points between each two secondary windings in the series connection. This transformer transforms two single-phase alternating voltages which have an offset of 120° in three single-phase voltages having the same offset and forming a three-phase alternating voltage. The offset between the single-phase alternating voltages at the primary windings of the transformer of 120° reduces the part of the period of the alternating voltages during which the current from the center point of the split DC link towards the two primary windings have the same direction to one third of the period of the alternating voltages. This means that the capacities of the split DC link may be kept particularly small.

Other features and advantages of the present invention will become apparent to one with skill in the art upon examination of the following drawings and the detailed description. It is intended that all such additional features and advantages be included herein within the scope of the present invention, as defined by the claims.

Referring now in greater details to the drawings, FIG. 1 depicts a three-phase inverter 1 feeding electric power from a DC power generator 2 which is a photovoltaic power generator 3 into a three-phase AC power grid 4. A component of the three-phase inverter 1 is a Scott-transformer 12 having two primary windings 10 and 11 and three secondary windings 5, 6 and 7. The primary windings 10 and 11 are separate from each other, whereas the secondary windings 5, 6 and 7 are combined to form one secondary winding arrangement which may be wound around a single transformer core. FIG. 1, however, indicates there are two transformer cores so that the Scott-transformer 12 is divided in two partial transformers Tr1 and Tr2. The winding numbers of the primary and secondary windings N1 to N5 may be used to adjust an increase or decrease in voltage between the primary and the secondary side of the Scott-transformer 12.

If no increase or decrease of the voltage is desired, the winding numbers comply with N1:N2=N1:N3=2 for the partial transformer Tr1, and with N4:N5=2/$\sqrt{3}$ for the partial transformer Tr2. Further, if both partial transformers Tr1 and Tr2 have the same core cross sectional area, the winding numbers also comply with N1=N4. To additionally increase or decrease the voltage with the Scott-transformer 12 the winding numbers N2, N3 and N5 are multiplied with the respective factor for the transformed voltage. The alternating voltage output by the Scott-transformer 12 is a three-phase alternating voltage with a phase offset of 120° between the single phases, if two alternating voltages having the same fixed frequency as the output three-phase alternating voltage but a phase offset of 90° are provided to the primary windings 10 and 11. These two alternating voltages are provided by an inverter circuitry 20 comprising two inverter half bridges 23 and 24 and a split DC link 25. The inverter half bridges 23 and 24 and the split DC link 25 are connected between two input lines 8 and 9 connected to the DC power generator 2. The split DC link 25 comprises two capacitors 21 and 22 of equal capacity connected in series between the input lines 8 and 9. A center point 16 of the split DC link 25 is connected to those terminals 17 and 18 of the primary windings 10 and 11 pointing toward each other in FIG. 1. The other terminals 26 and 27 of the primary windings 10 and 11 are connected to center points 28 and 29 of the inverter half bridges 23 and 24. Each of the half bridges 23 and 24 comprises two switches S2 and S4, and S3 and S5, respectively, which allow for alternately connecting the center points 28 and 29 to the potential of the input lines 8 and 9. However, the switches S2 to S5 are typically switched at a frequency substantially higher than the frequency of the alternating voltages to be supplied to the Scott-transformer 12 which allows forming sine shaped currents through the primary windings 10 and 11 by means of pulse width modulation PWM. The secondary windings 5 to 7 of the Scott-transformer are at one of their terminals all connected to a center point 19, whereas the three phases of the output three-phase alternating voltage are induced at their other terminals 30, 31 and 32.

Figure 2:
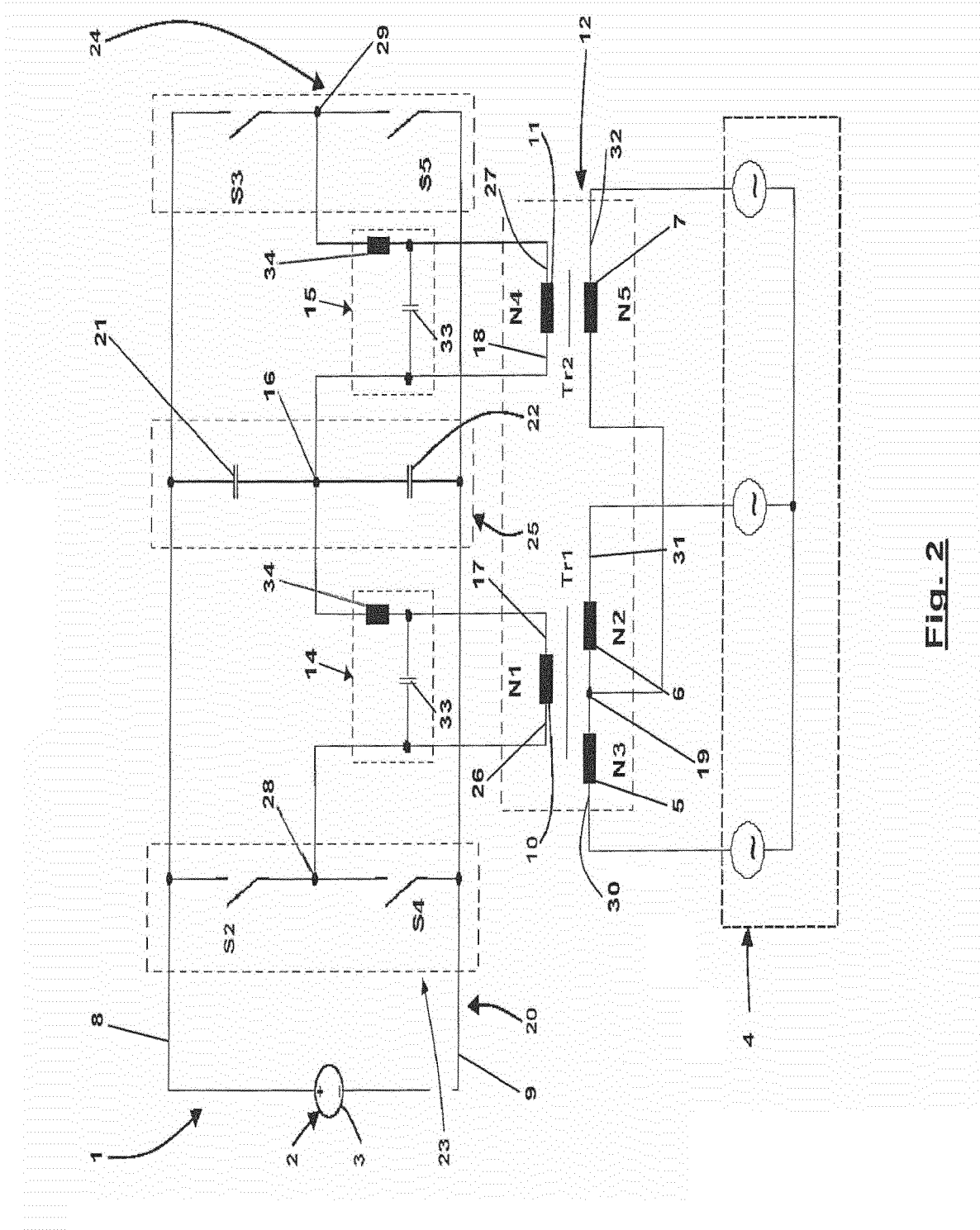
FIG. 2 is a circuit diagram of a second embodiment of the novel three-phase inverter Scott transformer.

The variant of the three-phase inverter 1 depicted in FIG. 2 additionally comprises two sine filters 14 and 15 each comprising a capacitor 33 and an inductor 34 to smoothen the pulse width modulated current through the primary windings 10 and 11. Thus, the course of the currents induced in the secondary windings 5 to 7 is also smoothened.

Figure 3:
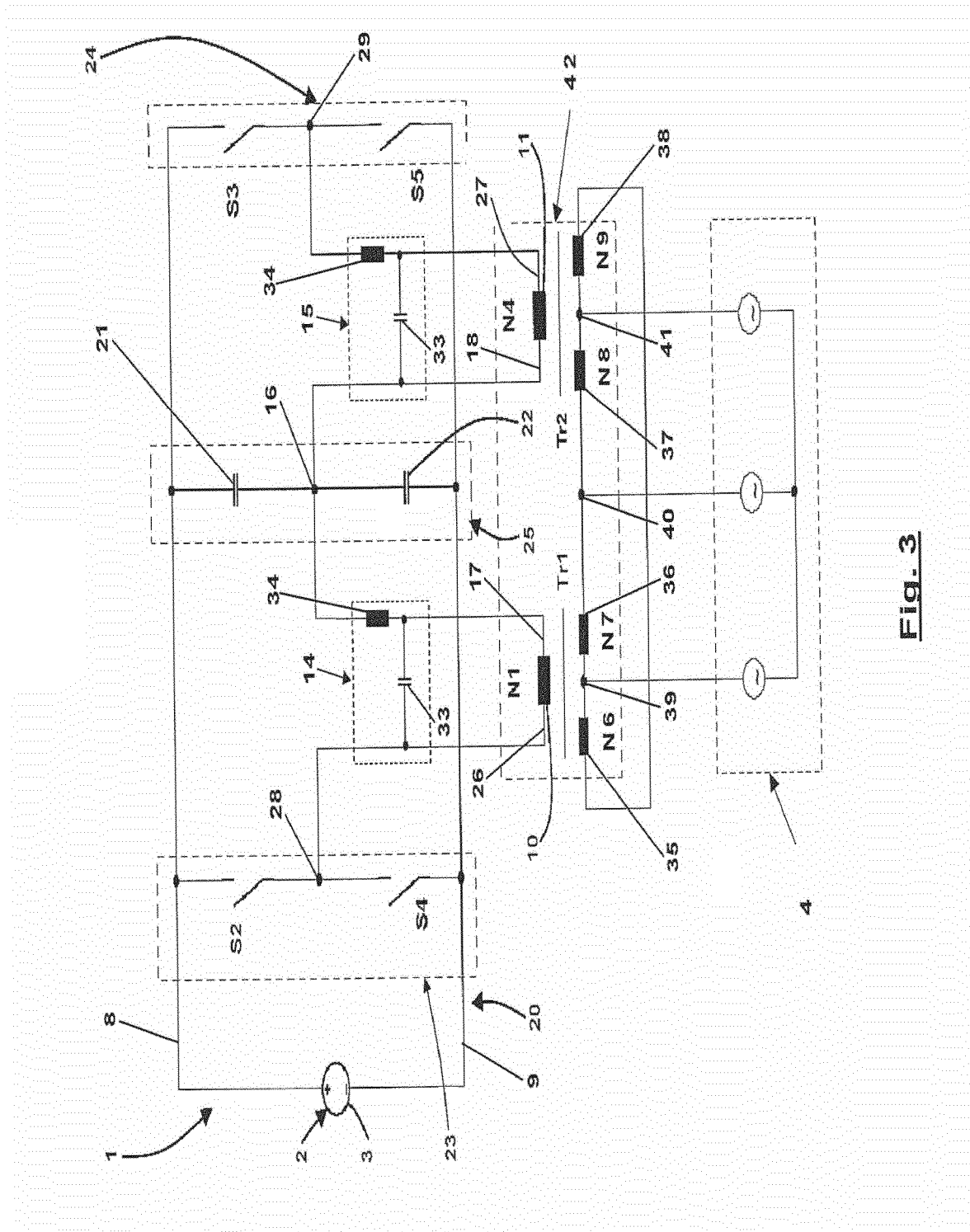
FIG. 3 is circuit diagram of a third embodiment of the novel three-phase inverter comprising of transformer with two primary and four secondary windings.

The embodiment of the novel three-phase inverter 1 depicted in FIG. 3 is comparable to the embodiment of the three-phase inverter 1 depicted in FIG. 2 except of the secondary side of the transformer, which is no Scott-transformer here but a transformer 42 having four secondary windings 35 to 38. These secondary windings 35 to 38 are connected in series, two secondary windings 35 and 36 of opposite winding orientation being part of the first partial transformer Tr1 including the primary winding 10, and the other two secondary windings 37 and 38 of opposite winding orientation being part of the second partial transformer Tr2 comprising the primary winding 11. The number of windings N6 to N9 of the secondary windings 35 to 38 are all the same and comply with N1=N4=N6=N7=N8=N9, if the transformer 42 does not generally increase or decrease the voltages applied to the primary windings 10 and 11 with regard to the three-phase alternating voltage provided at the secondary windings 35 to 38. This three-phase alternating voltage consisting of three single-phase alternating voltages offset at 120° is present at three connection points 39 to 41 between the secondary windings 35 and 36, 36 and 37, and 37 and 38, respectively. The transformer 42 comprises one additional winding as compared to the Scott-transformer 12 according to FIGS. 1 and 2. On the other hand, the alternating voltages to be supplied to the primary windings 10 and 11 to obtain the three-phase alternating voltage at the secondary side of the transformer 42 have an increased offset of 120°. This increase of the offset towards 180° decreases the requirements with regard to the necessary value of the capacities 21 and 22 of the split DC link 25.

In all three exemplary embodiments described here, the three-phase inverter 1 may comprise as few as four switches S2 to S5, plus capacitors 21, 22 of the split DC link and optionally capacitors 33 and inductors 34 of the sine filters 14 besides the transformer 12, 42 to provide a three-phase alternating output voltage of sinusoidal shape. As compared to other known three-phase inverters of similar performance, the novel three-phase inverter comprises a significantly reduced number of electric and electronic elements, while additionally providing a galvanic separation via the transformer and also allowing for increasing or decreasing the voltage level over the transformer.

Many variations and modifications may be made to the preferred embodiments of the invention without departing substantially from the spirit and principles of the invention. All such modifications and variations are indented to be included herein within the scope of the present invention, as defined by the following claims.

I claim:

1. A three-phase inverter for converting DC power from a generator into three-phase AC power, the three-phase inverter comprising:
a transformer for transforming two single phase alternating voltages with a fixed phase offset present at corresponding two primary windings of the transformer into a three-phase alternating voltage present at secondary windings of the transformer; and
an inverter circuitry for receiving a direct voltage of the generator between two input lines and for supplying the two single phase alternating voltages to the two primary windings of the transformer, the inverter circuitry comprising:
a split DC link having a center point connected to both input lines via corresponding capacitors and connected to a first terminal of each primary winding of the transformer, and
two inverter half-bridges connected to both input lines, wherein a center point of each half bridge is connected to a second terminal of a corresponding one of the primary windings of the transformer.

2. The three-phase inverter of claim 1, wherein each half-bridge comprises two semiconductor switches which are each connected between the center point and one of the input lines.

3. The three-phase inverter of claim 2, wherein the two switches of each half-bridge are configured to be switched at high frequency to form a sine shape of the single phase alternating voltages present at the primary windings of the transformer.

4. The three-phase inverter of claim 3, wherein the inverter circuitry further comprises two sine filters for smoothing the corresponding single phase alternating voltages present at the corresponding primary winding.

5. The three-phase inverter of claim 4, wherein each sine filter comprises a capacitor connected in parallel to the corresponding primary winding of the transformer and an inductor connected in series with the corresponding primary winding of the transformer.

6. The three-phase inverter of claim 1, wherein the transformer is a Scott transformer comprising three secondary windings connected to each other in T configuration with three outer terminals, and wherein the two single phase alternating voltages comprise a fixed phase offset of approximately 90°.

7. The three-phase inverter of claim 1, wherein the transformer is a transformer comprising two partial transformers each having one of the two primary windings and two secondary windings, the four secondary windings of both partial transformers being connected in series via three connections, and wherein the two single phase alternating voltages comprise a fixed phase offset of approximately 120°.

8. A three-phase inverter for converting DC power from a generator into three-phase AC power, the three-phase inverter comprising:
a Scott transformer having two primary windings and three secondary windings connected in T-configuration with three outer terminals, the Scott transformer being configured to transform two single phase alternating voltages at a fixed phase offset of approximately 90° which are applied to its two primary windings into a three-phase alternating voltage present at the three outer terminals; and
an inverter circuitry for receiving a direct voltage of the generator between two input lines and for supplying the two single phase alternating voltages to the two primary windings of the Scott transformer, the inverter circuitry comprising:
a split DC link having a center point connected to both input lines via corresponding capacitors and to a first terminal of each primary winding of the Scott transformer,
two inverter half-bridges, each comprising two semiconductor switches connected in series between the input lines, wherein a center point of each half-bridge is connected to a second terminal of a corresponding one of the primary windings of the Scott transformer, and wherein the two semiconductor are configured to be switched at a frequency substantially higher than a frequency of the two single phase alternating voltages to form a sine shape of the corresponding single phase alternating voltage; and
sine filters for smoothing the corresponding single phase alternating voltages.

9. The three-phase inverter of claim 8, wherein the sine filter comprises a capacitor connected in parallel to a corresponding one of the primary windings of the Scott transformer and an inductor connected in series with a corresponding one of the primary windings of the Scott transformer.

10. A three-phase inverter for converting DC power from a generator into three-phase AC power, the three-phase inverter comprising:
 a transformer comprising two partial transformers each having one primary windings and two secondary windings, the four secondary windings of both partial transformers being connected in series via three connections, the transformer being configured to transform two single phase alternating voltages at a fixed phase offset of approximately 120° which are applied to its two primary windings into a three-phase alternating voltage present at the three connections; and
 an inverter circuitry for receiving a direct voltage of the generator between two input lines and for supplying the two single phase alternating voltages to the two primary windings of the transformer, the inverter circuitry comprising:
  a split DC link having a center point connected to both input lines via corresponding capacitors and connected to a first terminal of each primary winding of the transformer,
  two inverter half-bridges, each comprising two semiconductor switches connected in series between the input lines, wherein a center point of each half-bridge is connected to a second terminal of a corresponding one of the primary windings of the transformer, and wherein the two semiconductor switches are configured to be switched at a frequency substantially higher than a frequency of the two single phase alternating voltages to form a sine shape of the corresponding single phase alternating voltage; and
  sine filters for smoothing the corresponding single phase alternating voltages.

11. The three-phase inverter of claim 10, wherein the sine filters each comprise a capacitor connected in parallel to a corresponding one of the primary windings of the transformer and an inductor connected in series with the corresponding one of the primary windings of the transformer.

12. The three-phase inverter of claim 10, wherein the four secondary windings comprise substantially the same number of windings, and wherein the two secondary windings of each partial transformer are of opposite winding orientation.

13. The three-phase inverter of claim 12, wherein the two primary windings comprise substantially the same number of windings, and wherein the number of windings of the primary windings is substantially equal to the number of windings of the secondary windings.

* * * * *